(12) United States Patent
Orlamünder et al.

(10) Patent No.: US 9,222,408 B2
(45) Date of Patent: Dec. 29, 2015

(54) DRIVE SYSTEM FOR A VEHICLE

(75) Inventors: Andreas Orlamünder, Schonungen (DE); Daniel Lorenz, Bad Kissingen (DE); Michael Kühner, Heilbronn (DE); Thomas Dögel, Nüdlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/124,215

(22) PCT Filed: May 9, 2012

(86) PCT No.: PCT/EP2012/058559
§ 371 (c)(1),
(2), (4) Date: Dec. 9, 2013

(87) PCT Pub. No.: WO2012/168024
PCT Pub. Date: Dec. 13, 2012

(65) Prior Publication Data
US 2014/0123929 A1  May 8, 2014

(30) Foreign Application Priority Data
Jun. 7, 2011 (DE) .......................... 10 2011 077 119

(51) Int. Cl.
*F02B 75/06* (2006.01)
*F16F 15/131* (2006.01)

(52) U.S. Cl.
CPC ........... *F02B 75/06* (2013.01); *F16F 15/13157* (2013.01)

(58) Field of Classification Search
CPC .................... F16H 2045/0268; F16H 57/0006; F02B 75/06

USPC ....................... 123/192.2, 192.1, 21
See application file for complete search history.

(56) References Cited

U.S. PATENT DOCUMENTS

| | | | | |
|---|---|---|---|---|
| 5,185,543 A * | 2/1993 | Tebbe | ............................. | 310/51 |
| 5,863,274 A * | 1/1999 | Jackel | ........................... | 475/347 |
| 6,405,701 B1 * | 6/2002 | Masberg et al. | ........... | 123/192.1 |
| 6,695,108 B1 * | 2/2004 | Hanke et al. | ................. | 192/3.29 |
| 7,073,474 B2 * | 7/2006 | Biel | ........................... | 123/192.1 |
| 2002/0033310 A1 * | 3/2002 | Sasse et al. | .................. | 192/3.29 |

(Continued)

FOREIGN PATENT DOCUMENTS

DE    196 34 380 A1    3/1997

*Primary Examiner* — Lindsay Low
*Assistant Examiner* — Long T Tran
(74) *Attorney, Agent, or Firm* — Cozen O'Connor

(57) ABSTRACT

A drive system for a vehicle has an internal combustion engine and a torsional vibration damping arrangement. The internal combustion engine is switchable between operating modes of different performance. The torsional vibration damping arrangement includes an input region, which can be driven in rotation, and an output region. A first torque transmission path is provided between the input region and output region, and a second torque transmission path is provided parallel thereto. A coupling arrangement superposes the torques transmitted via the torque transmission paths, and a phase shifter arrangement is provided in at least one torque transmission path for generating a phase shift of rotational irregularities transmitted via the one torque transmission path in relation to the rotational irregularities transmitted via the other torque transmission path.

6 Claims, 4 Drawing Sheets

(56) References Cited

U.S. PATENT DOCUMENTS

| | | |
|---|---|---|
| 2002/0046717 A1* | 4/2002 | Buehrle et al. ............. 123/90.12 |
| 2003/0109357 A1* | 6/2003 | Tabata ......................... 477/109 |
| 2005/0205060 A1 | 9/2005 | Michelini et al. |
| 2005/0205061 A1* | 9/2005 | Lewis et al. ................... 123/432 |
| 2007/0037659 A1* | 2/2007 | Bailey et al. .................. 475/296 |
| 2009/0088261 A1* | 4/2009 | Clark et al. ................... 464/68.1 |
| 2010/0199792 A1* | 8/2010 | Werner et al. ................... 74/330 |
| 2011/0083631 A1* | 4/2011 | Kreuter et al. ............. 123/192.2 |
| 2013/0197740 A1* | 8/2013 | Hagel et al. .................. 701/32.1 |
| 2013/0203541 A1* | 8/2013 | Lorenz et al. ................... 475/59 |

* cited by examiner

DRIVE SYSTEM FOR A VEHICLE

CROSS-REFERENCE TO RELATED APPLICATIONS

This is a U.S. national stage of application No. PCT/EP2012/058559, filed on 9 May 2012, which claims priority to the German Application No. 10 2011 077 119.0, filed 7 Jun. 2011, the content of both incorporated herein by reference.

BACKGROUND OF THE INVENTION

1. Field of the Invention

The present invention is directed to a drive system for a vehicle comprising an internal combustion engine and a torsional vibration damping arrangement coupled to a crankshaft of the internal combustion engine.

2. Related Art

Internal combustion engines used for driving vehicles have an irregular, particularly an oscillating, torque curve due to the combustion process and the ignitions occurring substantially periodically in the cylinders thereof. A vibration component is superposed on a nominal torque, wherein the vibration frequency depends on the combustion process, that is, on whether a two-stroke process or a four-stroke process is used, and on the quantity of cylinders. For example, in a four-cylinder four-stroke engine, an ignition occurs in two cylinders for every revolution of its crankshaft so that there are two excitation events per revolution of the crankshaft. Therefore, as regards the rotational speed of the crankshaft, the second order is critical because the ignition frequency in an internal combustion engine of this type corresponds to twice the rotational speed of the crankshaft. Correspondingly, in a three-cylinder four-stroke engine the 1.5th order is problematic with respect to vibrations, whereas in a four-cylinder two-stroke engine, the second order is problematic, again with respect to the rotational speed of the crankshaft.

In order to eliminate these excitations of vibrations, or to prevent them as far as possible from being transmitted into subsequent system areas of a drivetrain, torsional vibration damping arrangements are used that are tuned to the vibration excitation behavior in the drivetrain, particularly in the region of the internal combustion engine.

In modern internal combustion engines, it is possible to provide the capability of switching between different operating modes. Thus, for example, an internal combustion engine having multiple cylinders can be operated in such a way that all of the cylinders are active so that it is capable of providing maximum torque under full load conditions. If this is unnecessary, it is possible to change to an operating mode in which only some of the cylinders are active. In this case, the cylinders that remain active under a partial load condition are loaded to a greater degree, which generally entails the advantage that the internal combustion engine and the individual cylinders thereof can work with greater efficiency than under reduced load. This has an advantageous impact on consumption and pollutant emission. In principle, it is also possible to switch between different combustion processes, i.e., between two-stroke operation and four-stroke operation, and it is also possible in this case to switch between operating modes of different performance with high performance capacity in two-stroke operation, and the internal combustion engine can operate in four-stroke mode with a reduced performance requirement.

However, switching between different operating modes with different performance, i.e., particularly switching different cylinders on or off or changing between different combustion processes, has a substantial influence on the vibration excitation behavior in an internal combustion engine. For example, if half of the cylinders are deactivated in an internal combustion engine operating in four-stroke mode, the critical excitation order is also halved. For example, when two cylinders are switched off in a four-cylinder four-stroke engine, only one ignition takes place per revolution, with the result that the critical excitation order—again with respect to the rotational speed of the crankshaft—is now of the first order and no longer of the second order. But with this change in the vibration excitation behavior, the vibration damping behavior of a torsional vibration damping arrangement likewise changes. If this torsional vibration damping arrangement is tuned to a particular excitation spectrum, a shift in the excitation spectrum, particularly in the excitation order, can lead to a reduced vibration damping capability so that, as a result, rotational irregularities generated in the region of the internal combustion engine, that is, particularly vibration components in the torque, are transmitted to a greater extent to areas of the drivetrain downstream in the torque path.

SUMMARY OF THE INVENTION

It is the object of the present invention to provide a drive system for a vehicle in which an improved vibration damping behavior of vibration components generated in the region of the internal combustion engine is achieved in the transmitted torque.

According to one aspect of the invention, this object is met by a drive system for a vehicle comprising an internal combustion engine and a torsional vibration damping arrangement in which the internal combustion engine can be switched between operating modes of different performance, and the torsional vibration damping arrangement comprises an input region, which can be driven in rotation, and an output region, and a first torque transmission path is provided between the input region and the output region, and a second torque transmission path is provided parallel thereto, further comprising a coupling arrangement for superposition of the torques transmitted via the torque transmission paths. A phase shifter arrangement is provided in at least one torque transmission path for generating a phase shift of rotational irregularities transmitted via the one torque transmission path in relation to the rotational irregularities transmitted via the other torque transmission path.

It has been shown that the vibration damping behavior in a torsional vibration damping arrangement with torque splitting, phase shifting and superposition of torque is virtually unimpaired by changing the operating mode of an internal combustion engine. A torsional vibration damping arrangement of this type exhibits a very good damping characteristic in a comparatively broad spectrum of vibration excitations so that a particularly advantageous drive system results when combined with an internal combustion engine whose operating mode can be adapted to different power requirements.

It should be noted that operating modes of different performance, within the meaning of the present invention, refers to basic changes in the operating mode, that is, for example, operating with more or fewer active cylinders or changing from a four-stroke operation to a two-stroke operation, or vice versa, and not to the fuel injection amount or combustion air amount that is introduced into the individual cylinders in combustion operation and which is influenced by a driver corresponding to a power requirement.

As has already been stated, the operating modes can include a first operating state, in which all of the cylinders are working, and at least a second operating state, in which only some of the cylinders are working, and/or the operating modes can include a two-stroke operation and a four-stroke operation.

In order to bring about the phase shift in the torsional vibration damping arrangement in a reliable manner, according to an aspect of the invention, the phase shifter arrangement comprises a vibration system with a primary side and a secondary side rotatable with respect to the primary side against the action of a damper element arrangement.

According to one aspect, the coupling arrangement can comprise a planetary gear arrangement for bringing together the two torque components transmitted via the torque transmission paths. This planetary gear arrangement can include a planet gear carrier coupled to the second torque transmission path and which has a plurality of planet gears rotatably supported thereon so that the torque components can be brought together in a simple but stable design.

In this respect, in another aspect, it can be further provided that the planetary gear arrangement includes, coupled to the first torque transmission path, a first ring gear arrangement or sun gear arrangement in meshing engagement with the planet gears and, coupled to the output region, a second ring gear arrangement or sun gear arrangement in meshing engagement with the planet gears.

BRIEF DESCRIPTION OF DRAWINGS

The present invention will be described in more detail in the following with reference to the accompanying drawings. In the drawings.

DETAILED DESCRIPTION OF THE PRESENTLY PREFERRED EMBODIMENTS

Figure 1:
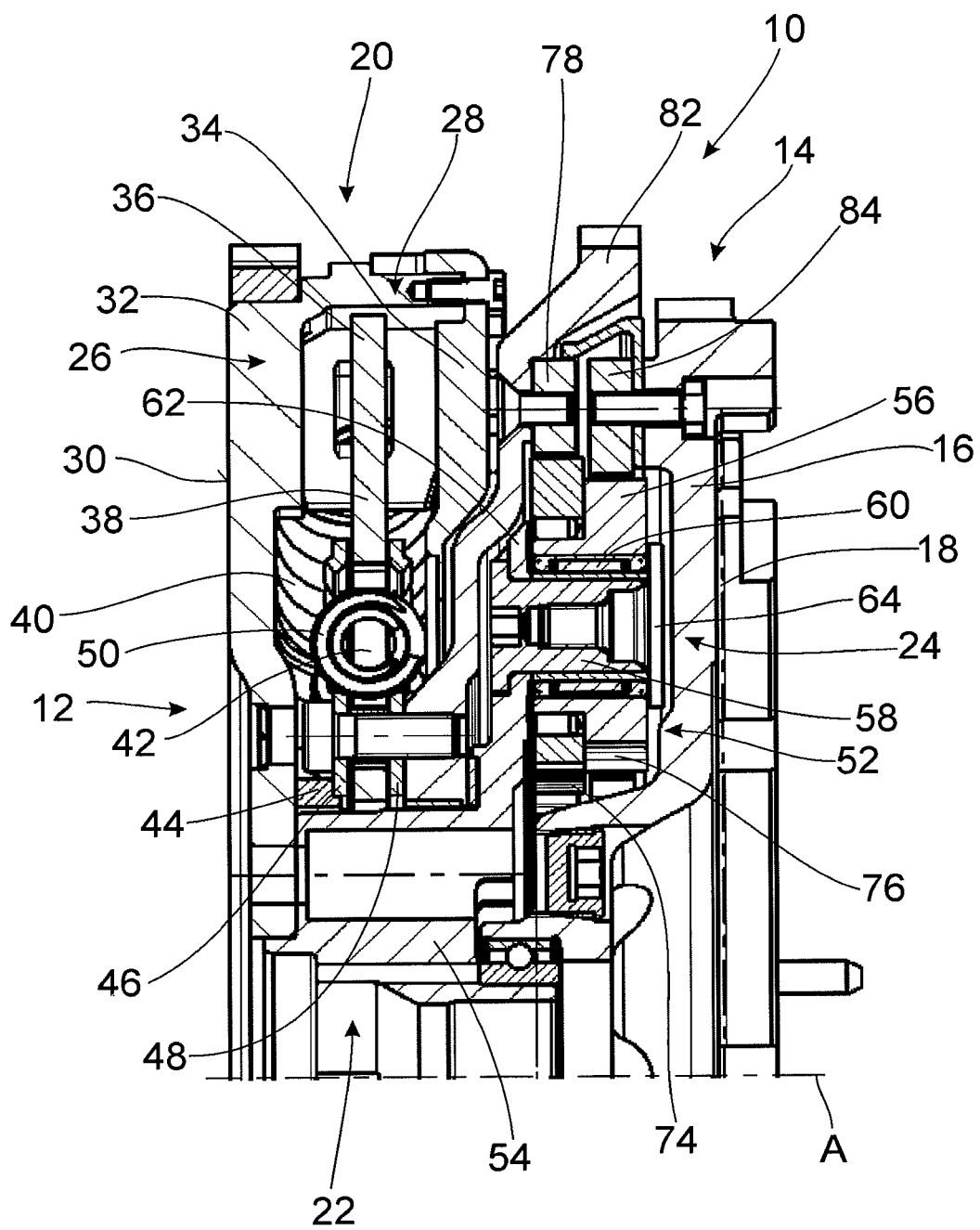
FIG. 1 is a partial longitudinal sectional view through a torsional vibration damping arrangement with torque splitting, phase shifting and superposition of torque.

FIG. 1 shows in partial longitudinal section a torsional vibration damping arrangement 10, which is to be positioned in the drivetrain of a vehicle. The torsional vibration damping arrangement 10 comprises an input region 12, which is to be connected by screws, for example, to the crankshaft of an internal combustion engine, i.e., generally a drive unit, and which is therefore to be driven in rotation around an axis of rotation A. An output region 14 of the torsional vibration damping arrangement 10 is formed with a flywheel 16 to which is connected, for example, a pressure plate assembly of a friction clutch and which can provide a friction surface 18 for a friction clutch of this kind. Two torque transmission paths 20, 22 arranged between the input region 12 and the output region 14 branch out in the input region 12 and converge in the region of a coupling arrangement designated generally by 24.

A phase shifter arrangement, designated generally by 26, is provided in the first torque transmission path 20. Torsional vibrations or generally rotational irregularities, which are introduced into the torsional vibration damping arrangement 10 in the input region 12, and which are also partially transmitted via the first torque transmission path 20, can be shifted in phase by the phase shifter arrangement 26 with respect to the corresponding torsional vibrations or rotational irregularities, which are also contained in the torque component transmitted via the second torque transmission path 22. These two torque components with torsional vibration components that have been shifted in phase relative to one another are brought together in the region of the coupling arrangement 24 so that the vibration components, which are shifted in phase relative to one another, ideally cancel each other so that a total torque that is substantially free from rotational irregularities and torsional vibrations is introduced into the output region 14.

The phase shifter arrangement 26 comprises a vibration system 28 with a first primary side 30 that is formed generally by two cover disk elements 32, 34. The torsional vibration damping arrangement 10 is fixedly connected to a driveshaft or the like in the region of cover disk element 32. The vibration system 28 further comprises a first secondary side 36, which is substantially provided in this case by a central disk element 38 positioned between the two cover disk elements 30, 34. A first damper element arrangement 40, which is formed by a plurality of springs, preferably helical compression springs, acts between the first primary side 30 and the first secondary side 36 and allows the latter to rotate relative to one another around the axis of rotation A while generating a restoring action.

In the radially inner region, the central disk element 38 provides a second primary side 42. A second secondary side 44, which again comprises two cover disk elements 46, 48, is associated with this second primary side 42. A second damper element arrangement 50, which, for example, again comprises a plurality of springs, e.g., helical compression springs, which are distributed in the circumferential direction, acts between the second primary side 42 and the second secondary side 44 so that the second primary side 42 and the second secondary side 44 are rotatable relative to one another around the axis of rotation A accompanied by the restoring action of the second damper element arrangement 50.

The vibration system 28 is formed with two stages with two vibration dampers acting in series and comprising the two damper element arrangements 40, 50. In this manner, the first primary side 30 substantially forms the primary side of the entire vibration system 28, i.e., that side on which the torque is introduced in the tension state, while the second secondary side 44 provides the secondary side of the entire vibration system 28, i.e., that side via which the torque is transmitted.

An essential characteristic of vibration systems of this kind is that they operate subcritically in an excitation frequency range below their natural or resonant frequency, i.e., excitation and reaction of the system at the primary side 30 on the one hand, and at the secondary side 44 on the other hand take place substantially simultaneously, i.e., in the same phase without a mutual phase shift. When the resonant frequency is exceeded, the vibration system 28 passes into a supercritical state in which excitation and reaction are shifted in phase with respect to one another. Accordingly, a maximum phase shift of 180° can occur. As a result, when there are exciting frequencies in the torque received at the input region 12 that are above the resonant frequency and therefore, depending on the quality of vibration decoupling, undergo a maximum phase shift of 180° in the first torque transmission path 20 with respect to the vibration excitation components contained in the torque component of the second torque transmission path 22, there is, ideally, a complete destructive superposition of these vibration components with the in-phase vibration components in the coupling arrangement 24.

The coupling arrangement 24 comprises a planetary gear arrangement 52 with a planet gear carrier 54. This planet gear carrier 54 together with the primary side 30 of the vibration system 28 is connected to the driveshaft and is associated with the second torque transmission path 22. A plurality of planet gears, designated generally by 56, are rotatably supported at the planet gear carrier 54 so as to be distributed in the circumferential direction. For this purpose, a plurality of planet gear carrying bolts 58 are provided at the planet gear carrier 54, as is clearly shown in FIG. 2. The planet gears 56 are rotatable around the rotational axes Z thereof, which are oriented substantially parallel to the axis of rotation A of the planet gear carrier 54, via a bearing 60 that is formed, for example, as a needle bearing or other type of rolling element bearing. The planet gears 56 are held so as to be axially centered between two supporting elements 62, 64 formed, e.g., as annular disks or supporting element 64 and planet gear carrier 54.

The planet gears 56 have two toothed regions 74, 76 arranged consecutively in direction of the rotational axes Z of the planet gears. Toothed region 74, which is formed in the illustrated example with greater radial dimensioning with respect to the rotational axis Z of the planet gears, meshingly engages with a ring gear 78, which is fixed to a ring gear carrier 82 and which, for example, can have an annular or ring segment shape. The ring gear carrier 82 is in turn fixedly connected, for example, by screws, to the second secondary side 44, i.e., generally the secondary side of the vibration system 28, and is accordingly associated with the first torque transmission path 20. The torque that is transmitted via the first torque transmission path 20 and conveyed by the vibration system 28 is introduced into the coupling arrangement 24, namely, the working teeth 74 of the planet gears 56, via the ring gear carrier 82 and ring gear 78. The torque transmitted via the second torque transmission path 22 is introduced into the coupling arrangement 24 via the planet gear carrier 54 and the planet gear carrying bolts 58. The torque components brought together in this way are conveyed as a total torque via the working teeth region 76 into a ring gear 84 which has an annular or ring segment shape, for example. The ring gear 84 is connected to the flywheel 16 by screws and is accordingly associated with the output region 14.

By bringing together the two torque components of the two torque transmission paths 20, 22 in the coupling arrangement 24 formed with the planetary gear unit 52, a superposition takes place when the vibration system 28 passes into the supercritical state as a result of the vibration excitation such that the vibration components are at least partially canceled and the flywheel 16 receives a substantially smoothed torque. In this respect, the magnitude of the torque components transmitted via the two torque transmission paths 20, 22 can be influenced through the choice of the diameter ratio of the two working teeth regions 74, 76 or also by the design of the tooth geometry of these two working teeth regions 74, 76. In the illustrated example, in which the toothed region 74 cooperating with the ring gear 78 of the first torque transmission path 20 has a greater radial dimensioning than the toothed region cooperating with the ring gear 84 of the output region 14, a transmission ratio of i>1 is achieved, which means that a torque component is transmitted in direction of the planetary gear unit 52 via each of the two torque transmission paths, and the ratio of components can be adjusted through the relative proportions or diameter ratio of the two working teeth regions 74, 76. If toothed region 76 has a greater diameter than toothed region 74, a torque reversal takes place in the second torque transmission path 22, whereas torque is increased in the first torque transmission path 20, so that when the torque components are brought together in the coupling arrangement 24 a total torque, which corresponds to the introduced torque, is achieved again, but wherein the vibration components are at least partially eliminated.

It should be noted here that various aspects of the torsional vibration damping arrangement 10 described in detail above referring to FIG. 1 could also be configured differently. For example, instead of the two ring gears 82, 84, the planetary gear arrangement 52 could comprise sun gears coupled to the secondary side 44 on the one hand and to the output region 14 on the other hand. Of course, it would also be possible to provide a phase shifter arrangement in the second torque transmission path 22, which phase shifter arrangement has a transition to the supercritical state at a different rotational speed and/or causes a different phase shift than the phase shifter arrangement 26 provided in the first torque transmission path 20. Further, damping systems, e.g., fluidically acting damping systems or coulomb friction damping systems, can of course also be provided in conjunction with a phase shifter arrangement 26 of this type. Also, of course, a vibration system of this kind could be constructed with one stage, i.e., with a primary side and a secondary side and an individual torsional vibration damping arrangement acting therebetween.

Figure 2:
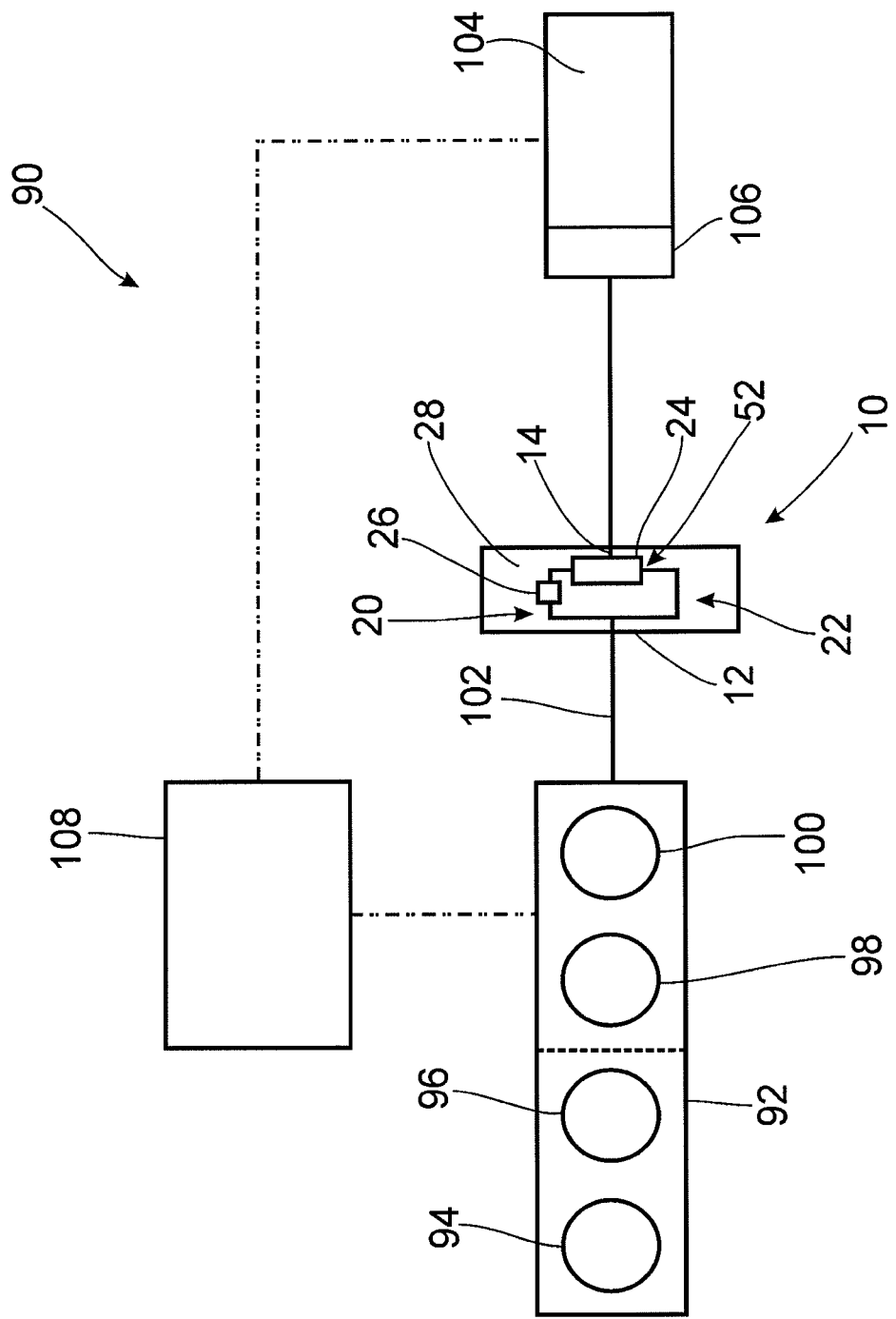
FIG. 2 is a schematic view of a drive system with an internal combustion engine and a torsional vibration damping arrangement according to FIG. 1.

FIG. 2 shows a drive system 90 for a vehicle in which a torsional vibration damping arrangement 10 of the type described above is integrated. This drive system 90 comprises as a drive unit an internal combustion engine 92 which, in the present example, is a four-cylinder internal combustion engine with cylinders 94, 96, 98, 100. A crankshaft 102 of the internal combustion engine 92, acting as driveshaft, is coupled to the input region 12 of the torsional vibration damping arrangement 10 and drives the latter in rotation around the axis of rotation A which can be seen in FIG. 1. In the depicted example, the output region 14 of the torsional vibration damping arrangement 10 is coupled to a starting element 106, which precedes a gear unit 104. When the gear unit 104 is configured as a shift transmission, the starting element 106 can be a friction clutch, i.e., for example, a dry running or wet running friction clutch, multidisk clutch, dual clutch or the like. When the gear unit 104 is an automatic transmission, the starting element 106 can be constructed as a hydrodynamic torque converter. Its housing can then be coupled to the output region 14 of the torsional vibration damping arrangement 10 and driven in rotation around the axis of rotation A by the latter.

A control device 108, associated with the internal combustion engine 92, controls or adjusts the operation of the internal combustion engine 92 on the one hand and, on the other hand, as is illustrated by the link to the gear unit 104, also receives information about the operating state of a vehicle, e.g., vehicle speed, engaged gear step, and the like and, based on this information, controls, for example, the internal combustion engine 92 or a gear unit 104 configured as an automatic transmission.

Further, depending on the load demanded, the control device 108 can switch the internal combustion engine 92 between different operating modes. In full load operating mode, all four of the cylinders 94, 96, 98, 100 can be operated, i.e., can be active, while in a partial load operating mode, cylinders 94, 96 can be disabled and only cylinders 98, 100 remain in operation. This transition between full load operating mode, i.e., when all of the cylinders 94, 96, 98, 100 are in operation, and partial load operating mode, i.e., when only cylinders 98, 100 are in operation, has an effect on the vibration components contained in the transmitted torque and, therefore, on the torque conveyed into the drivetrain. This will be explained in the following referring to FIGS. 3 and 4.

Figure 3:
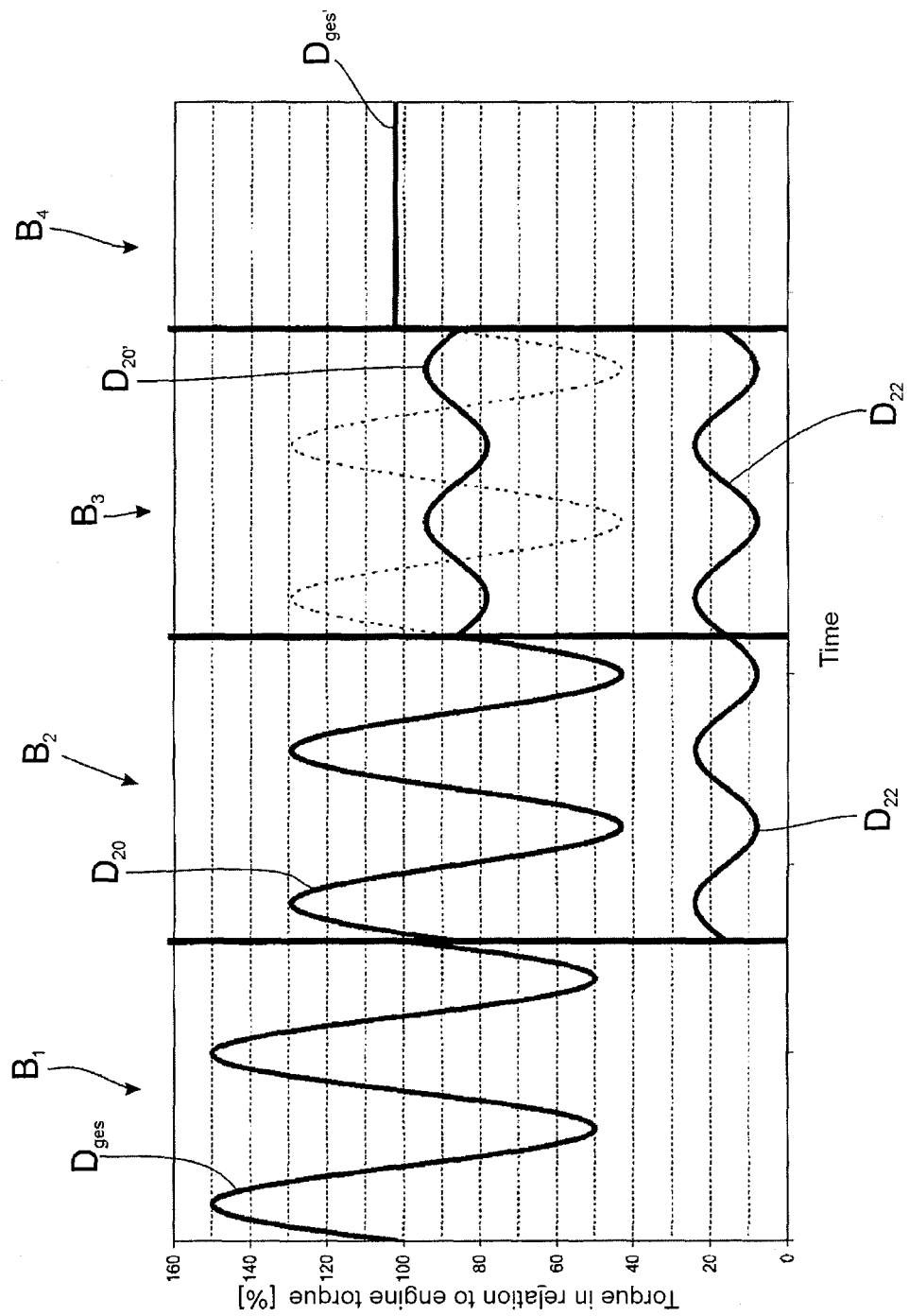
FIG. 3 is a graph illustrating torques and torque vibrations occurring in different regions of the drive system of FIG. 2 and in the torsional vibration damping arrangement of FIG. 1 in an internal combustion engine operating in an operating mode.

FIG. 3 is divided into four areas where the torque in different system areas is plotted over time. Area $B_1$ in FIG. 3 shows the torque $D_{ges}$ which is transmitted by the internal combustion engine in the region of the crankshaft 102 and accordingly introduced into the input region 12. It will be seen that a vibration generated by the ignitions in the individual cylinders is superposed on a nominal torque of 100%. In particular, area $B_1$ illustrates a revolution of the crankshaft 102 over the course of which ignition occurs in two of the four cylinders 94, 96, 98, 100, i.e., two vibration-exciting events take place.

Area $B_2$ again shows the torque components for a revolution of the crankshaft 102 which are split in the input region 12 between the two torque transmission paths 20, 22. It will be seen that these two torque components $D_{20}$, $D_{22}$ which are still in phase with one another are unequal in amount. The larger torque component $D_{20}$ is transmitted via the first torque transmission path 20, while the smaller torque component $D_{22}$ is transmitted via the second torque transmission path 22. As has already been stated, the division of the torque components can be adjusted particularly through the configuration of the two toothed regions 74, 76.

Area $B_3$ in FIG. 3 shows the torque components $D_{20}{'}$ transmitted into the two torque transmission paths 20, 22, i.e., in the first torque transmission path 20 after the phase shifter arrangement 26, and $D_{22}$, i.e., the torque that is basically transmitted in the second torque transmission path 22.

It will be seen that on the one hand, ideally, a phase shift of 180° is generated by the vibration system 28 of the phase shifter arrangement 26 when the latter operates in the supercritical state and, on the other hand, due to the decoupling generated in the vibration system 28 itself, a vibration damping is split so that the vibration amplitudes in the two torque transmission paths 20, 22 are approximately equal.

Area $B_4$ illustrates the torque $D_{ges}{'}$ after being brought together in the coupling arrangement 24, i.e., the torque received and conveyed in the output region 14. This is achieved by superposing the two torque components $D_{20}{'}$ and $D_{22}$ and, ideally, i.e., with a phase shift of 180° and substantially the same vibration amplitude, has a smoothed, approximately constant curve.

Figure 4:
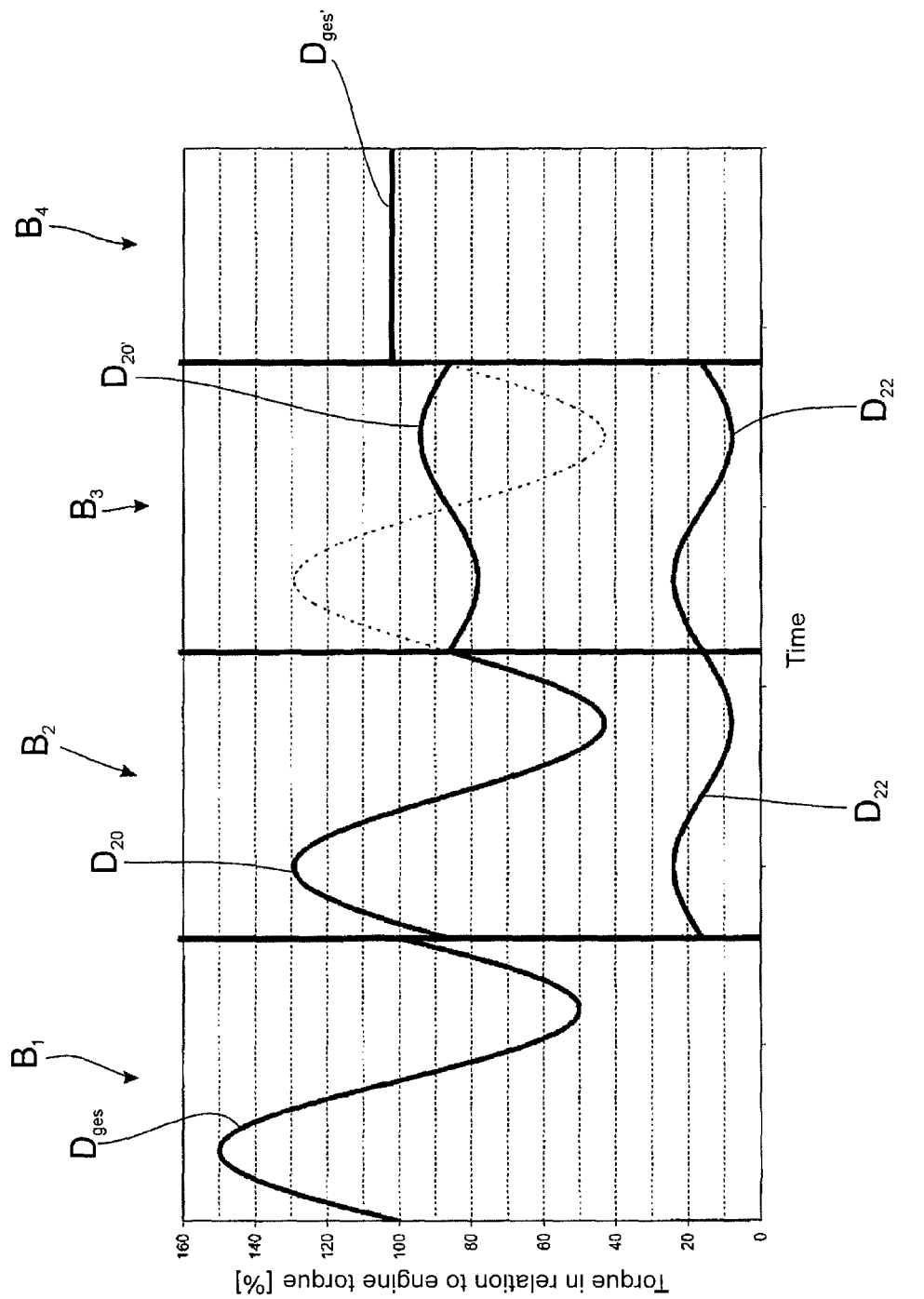
FIG. 4 is an illustration corresponding to FIG. 3 with an internal combustion engine operating in a different operating mode.

FIG. 4 illustrates these four areas $B_1$ to $B_4$ in the partial load operating mode of the internal combustion engine 92. By switching off the two cylinders 94, 96, there remains only one ignition per revolution, i.e., one vibration-exciting event takes place. The torque superimposed with a vibration component of this kind, i.e., the total torque $D_{ges}$ as transmitted by the crankshaft 102, is again split in input region 12 into the two components $D_{20}$ and $D_{22}$. Following the phase shifter arrangement 26, i.e., in area $B_3$, the torque component $D_{20}{'}$ transmitted in the first torque transmission path 20 is again shifted in phase on the one hand and, on the other hand, is already reduced in amplitude so that a substantially smoothed total torque $D_{ges}{'}$ which is ideally completely free from vibration components is transmitted in area $B_4$, i.e., following the coupling arrangement 24.

A comparison of FIGS. 3 and 4 shows that the damping behavior that is brought about primarily through the torque splitting, phase shift and the superposition of torque is not dependent on the frequency of the vibration components contained in the torque as long as this frequency is above the natural or resonant frequency of the vibration system 28 of the phase shifter arrangement 26. In other words, in conjunction with an internal combustion engine 92 whose operating mode can be varied in the sense explained in the preceding in order to adapt the power output, the vibration system 28 should be designed in such a way, with respect to the position of its natural frequency, that this natural frequency lies below the lowest vibration excitation frequency anticipated in the various operating modes. Ideally, the natural frequency of the vibration system 28 can be in a range close to or below the idling speed.

As has already been stated, the transition between operating modes of different performance can take place by switching individual cylinders on and off, which has an immediate effect on the vibration-exciting events occurring per revolution of a crankshaft. This switching off can be accomplished, for example, by adjusting the fuel injection into the cylinders to be switched off or by influencing the control times by means of a variable valve control. Alternatively, the performance can also be influenced in that a four-stroke engine is optimally designed for partial load operation and is switched to a two-stroke operation when increased load is demanded.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive system for a vehicle, comprising:
    an internal combustion engine (92), the internal combustion engine (92) being switchable between operating modes of different performance;
    a torsional vibration damping arrangement (10), the torsional vibration damping arrangement (10) comprising:
        (i) an input region (12) configured to be driven in rotation, and
        (ii) an output region (14), a first torque transmission path (20) being provided between the input region (12) and output region (14);
    and a second torque transmission path (22) being provided parallel thereto;
    a coupling arrangement (24) configured to superpose the torques transmitted via the first and second torque transmission paths (20, 22); wherein the coupling arrangement comprises a planetary gear arrangement (52), including a first and second planet gear;
    a phase shifter arrangement (26), provided in at least one torque transmission path (20), configured to generate a phase shift of rotational irregularities transmitted via the one torque transmission path (20) in relation to the rotational irregularities transmitted via the other torque transmission path (22);
    wherein the planetary gear arrangement includes:
    a first ring gear arrangement in meshing engagement with the first planet gear and connected to the first torque transmission path, and a second ring gear arrangement in meshing engagement with the second planet pear and connected to the output region.

2. The drive system according to claim 1, wherein the internal combustion engine is a piston engine having at least two working cylinders.

3. The drive system according to claim 2, wherein the operating modes include a first operating state in which all of the cylinders (94, 96, 98, 100) are in operation and at least a second operating state in which only some of the cylinders (98, 100) are in operation.

4. The drive system according to claim 1, wherein the operating modes include two-stroke operation and four-stroke operation.

5. The drive system according to claim 1, wherein the phase shifter arrangement (26) comprises a vibration system (28) with a primary side (30) and a secondary side (44) rotatable with respect to the primary side (30) against the action of a damper element arrangement (40, 50).

6. The drive system according to claim 1, wherein the planetary gear arrangement (52) includes a planet gear carrier (54) coupled to the second torque transmission path (22) and having a plurality of planet gears (56) rotatably supported thereon.

* * * * *